US 6,617,597 B2

(12) United States Patent
Hilton (10) Patent No.: US 6,617,597 B2
(45) Date of Patent: Sep. 9, 2003

(54) CIRCUITS AND METHODS FOR ELECTRON-BEAM CONTROL

(75) Inventor: Richard Lee Hilton, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/997,185

(22) Filed: Nov. 30, 2001

(65) Prior Publication Data

US 2003/0102442 A1 Jun. 5, 2003

(51) Int. Cl.[7] .............................. A61N 5/00; G21G 5/00
(52) U.S. Cl. ................. 250/492.3; 250/310; 250/251; 396/100; 396/101
(58) Field of Search ........................ 399/101; 396/100; 365/151; 250/310, 251, 492; 219/121.27; 313/337; 156/643; 430/5

(56) References Cited

U.S. PATENT DOCUMENTS

| | | | | | |
|---|---|---|---|---|---|
| 5,196,707 A | * | 3/1993 | Gesley | ...................... | 250/398 |
| 5,254,911 A | * | 10/1993 | Avnery et al. | ............... | 315/366 |
| 5,334,282 A | * | 8/1994 | Nakayama et al. | .......... | 430/296 |
| 5,557,596 A | * | 9/1996 | Gibson et al. | .............. | 369/101 |
| 5,945,683 A | * | 8/1999 | Ohkawa et al. | ........... | 250/492.3 |
| 6,066,849 A | * | 5/2000 | Masnaghetti et al. | ........ | 250/310 |

* cited by examiner

Primary Examiner—John R. Lee
Assistant Examiner—Erin-Michael Gill (57) ABSTRACT

An electron-beam controller (EBC) capable of controlling the power in an electron-beam is disclosed. The EBC can be implemented with an emitter, an extractor, a current mirror, and an input current having a magnitude responsive to the desired electron beam current. An EBC suited for low-efficiency emitters is also disclosed. A method for controlling the power intensity of an electron-beam over time is also disclosed. The method includes the steps of: (1) providing an emitter at a first voltage, (2) providing a target at a second voltage, (3) introducing an extractor at a controllable third voltage, (4) estimating the actual electron beam energy by sensing the emitter current; and (5) adjusting the third voltage in response to the sensed emitter current.

25 Claims, 8 Drawing Sheets

CIRCUITS AND METHODS FOR ELECTRON-BEAM CONTROL

TECHNICAL FIELD

The present disclosure relates to electronic control of an electron beam. More particularly, circuits and methods for electron-beam energy control are disclosed.

BACKGROUND OF THE INVENTION

Researchers have continually attempted to increase the storage density and reduce the cost of data storage devices such as magnetic hard-drives, optical drives, and dynamic random access memory (DRAM). It has, however, become increasingly difficult to increase storage density due to fundamental limits such as the paramagnetic limit, below which magnetically polarized materials are unstable at operating temperatures.

Several approaches have been used to increase storage density of data storage devices. One approach is based on scanned probe microscopy (SPM) technology. In such an approach, a probe is positioned extremely close to a storage medium. An example is atomic force microscopy (AFM) in which a probe is placed in physical contact with the storage medium. A second approach uses scanning tunneling microscopy (STM). In this approach, a probe is placed within a few nanometers of a surface of the storage medium to ensure that the probe is within a tunneling range of the medium. Although some success has been achieved using these approaches, it is difficult to economically manufacture data storage devices with probes that contact or that are in close proximity to the storage medium as these data storage devices require adequate protection schemes to prevent damage to the probe and/or the surface of the medium. Moreover, in STM, the distance from the probe to the medium must be precisely controlled. As known by persons having ordinary skill in the art, such control at the picometer scale is difficult to achieve.

In view of the difficulties associated with SPM, other researchers have developed methods that eliminate the need for extremely close proximity between the probe and the data storage medium. One such technique is based on near-field scanning optical microscopy (NSOM). Although NSOM avoids the precise control problem inherent with SPM, the NSOM technique has limited lateral resolution and bandwidth and consequently has limited practical applicability. Other techniques have been developed based on non-contact SFM, but these techniques typically suffer from poor resolution and poor signal to noise ratios.

Even where increased storage density can be achieved, hurdles to effective implementation exist. One such hurdle is the time required to access data stored on the storage device. Specifically, the utility of the storage device is limited if a relatively long time is required to retrieve the stored data. These data processing delays become more important with each increase in microprocessor clock speeds. Consequently, in addition to high storage density, there must be a mechanism for quickly accessing stored data.

Recently, semiconductor-based electron sources have been developed that can be used in storage devices and which may avoid the difficulties noted above. An example of such a data storage device is described in U.S. Pat. No. 5,557,596. The storage device described in the '596 patent includes multiple electron sources having electron emission surfaces that face a storage medium. During write operations, the electron sources bombard the storage medium with relatively high-energy electron beams. During read operations, the electron sources bombard the storage medium with relatively low-energy electron beams. Such a device provides advantageous results. For instance, the size of storage bits in such devices may be reduced by decreasing the electron beam diameter, thereby increasing storage density and capacity and decreasing storage costs.

One type of electron source described in the '596 patent is the "Spindt" emitter. As described in the '596 patent, such an emitter has a cone shape with a tip from which electron beams can be emitted. Typically, the tip is made as sharp as possible to reduce operating voltage requirements and to achieve a highly focused electron beam. Unfortunately, utilization of Spindt emitters creates other problems. First, the fabrication of sharp emitter tips is difficult and expensive. In addition, focusing the electron beam from a Spindt tip in a temporally and spatially stable manner is difficult. Furthermore, the electron optics for focusing the emitted beams is complicated. Moreover, Spindt emitters do not operate well in poor vacuums. These problems become particularly important as the electron beam diameter is reduced below 100 nanometers.

Accordingly, alternative electron sources and focusing mechanisms are presently under development. Regardless of the type of electron source selected for the storage device, however, it is important to control the energy within the electron-beam directed at the data storage media.

Electron-beam control in ultra-high density storage devices such as that described in the '596 patent presents a number of problems. First, mechanisms and or methods for directly measuring the electron-beam intensity incident at the surface of the data storage media would adversely effect the bit storage density and would add significantly to the cost of the storage device. Second, conventional current control techniques, when applied to electron emitters, causes the emitter voltage to vary over time. Consequently, controlling the electron beam by varying the emitter voltage results in an undesirable change in the overall potential between the surface of the storage medium and the emitter, thus changing the electron beam current in addition to the voltage potential inducing the beam. Third, a current control technique based on the assumption that the electron-beam current is a fixed fraction of the total current is susceptible to undesired variation in electron-beam power when the emitter efficiency is very low (e.g., in the range of 1% to 10%). Stated in another way, small variations in emitter efficiency would result in relatively large variation in the electron-beam current incident at the storage medium.

From the foregoing, it can be appreciated that it would be desirable to have a circuit and method for controlling the energy in an electron-beam generated by electron emitters that avoids one or more of the problems identified above.

SUMMARY OF THE INVENTION

Briefly described, in architecture, an electron-beam controller (EBC) capable of controlling the electron-beam power incident at the surface of a data storage medium can be realized with an emitter, an extractor, a current mirror, and an input current having a magnitude responsive to the desired electron beam current. For low-efficiency emitters (e.g., an emitter configured in such a manner that a significant portion of the total emitter current is sourced by an extractor) an EBC can be realized with the low-efficiency emitter coupled to a first current mirror, an extractor coupled to a second current mirror, and an input current having a magnitude responsive to the desired electron beam current, wherein the emitter and extractor currents are sensed to determine the actual beam current and the first current mirror adjusts the extractor voltage in response to the relationship between the desired electron beam current and the sensed electron beam current.

Other embodiments of the EBC may be realized in methods for controlling the power intensity of an electron-beam over time. A preferred method includes the steps of: (1) providing an emitter at a first voltage, (2) providing a target at a second voltage, (3) introducing an extractor at a controllable third voltage, (4) estimating the actual electron beam energy by sensing the emitter current; and (5) adjusting the third voltage in response to the sensed emitter current.

Other features and advantages of the circuit and method for electron-beam power control will become apparent to one skilled in the art upon examination of the following drawings and detailed description. It is intended that all such additional features and advantages included herein are protected by the accompanying claims.

BRIEF DESCRIPTION OF THE DRAWINGS

The EBC can be better understood with reference to the following drawings. The components in the drawings are not necessarily to scale, emphasis instead being placed upon clearly illustrating the principles of the invention. Moreover, in the drawings, like reference numerals designate corresponding parts throughout the several views.

DETAILED DESCRIPTION

Figure 1:
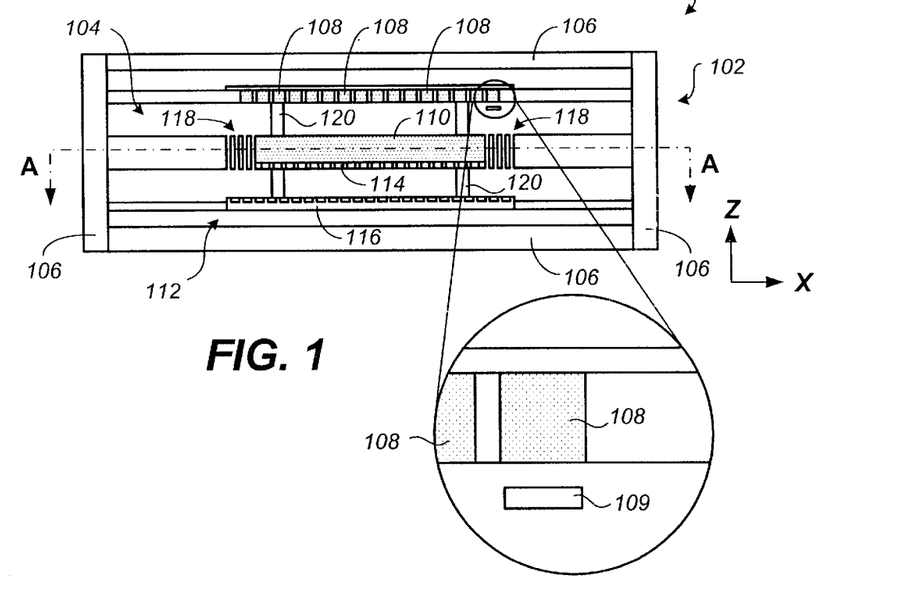
FIG. 1 is a side view of an exemplar data storage device.
Figure 2:
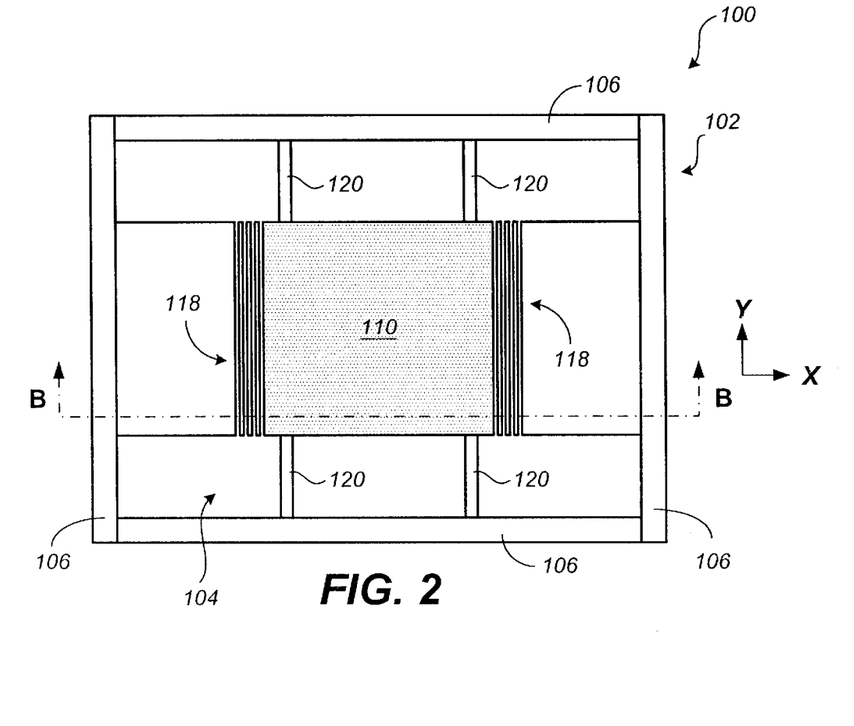
FIG. 2 is a cross-sectional view of the data storage device of FIG. 1 taken along line A—A (FIG. 1).
Figure 3:
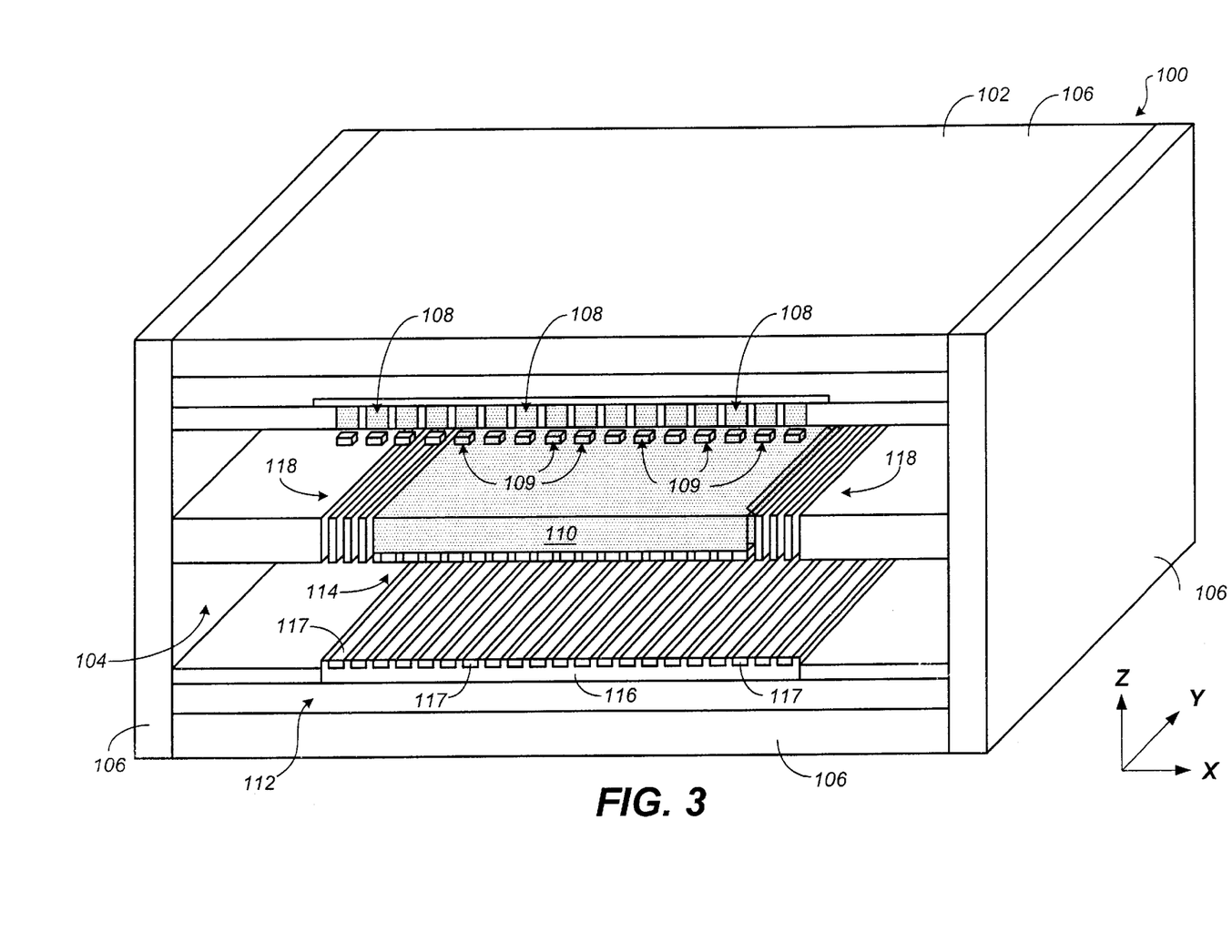
FIG. 3 is a cross-sectional perspective view of the data storage device of FIGS. 1 and 2 taken along line B—B (FIG. 2).

Referring now in more detail to the drawings, in which like numerals indicate corresponding parts throughout the several views, FIGS. 1–3 illustrate an exemplar data storage device. It is noted that data storage device is similar in construction to that described in U.S. Pat. No. 5,557,596, which is hereby incorporated by reference into the present disclosure.

As indicated in FIGS. 1–3, data storage device 100 generally includes an outer casing 102 that forms an interior space 104 therein. By way of example, the outer casing 102 can include a plurality of walls 106 that define the interior space 104. Typically, the walls 106 of the casing 102 are sealed to each other such that a vacuum can be maintained within the interior space 104. By way of example, the outer casing 102 maintains a vacuum of at least approximately $10^{-3}$ torr within the interior space 104. Although a particular configuration is shown for the outer casing 102, it is to be understood that the outer casing 102 can take many different forms that would be readily apparent to persons having ordinary skill in the art.

Within the interior space 104 is a plurality of electron emitters 108 that face a storage medium 110. As described in relation to FIG. 4, the storage medium 110 comprises a plurality of storage areas (not discernible in FIGS. 1–3). In a preferred embodiment, each storage area of the storage medium 110 is responsible for storing one or more bits of data.

The electron emitters 108 are configured to emit electron beam currents toward the storage areas of the storage medium 110 when a voltage difference is provided between the surface of the storage medium 110 and the electron emitters 108. Electron optics may be useful in focusing the electron beams. Focusing of the various electron beams may be required depending upon the distance between the electron emitters 108 and the storage medium 110, the type of emitters, and the beam spot size required. As illustrated in the insert within FIG. 1, an extractor 109 may be inserted in the gap between each of the plurality of emitters and the storage medium 110 (note one extractor shown for simplicity of illustration). A voltage difference between the electron emitters 108 and the extractors 109 (one shown) may be provided to either accelerate or decelerate the emitted electrons and/or to aid in focusing the emitted electrons. Note that more than one bit may be stored within an electron beam spot size, the writing and reading operations of these multiple bits may require focusing of the emitted electrons.

Each electron emitter 108 can serve many different storage areas to write data to and read data from the storage medium 110. To facilitate alignment between each electron emitter 108 and an associated storage area, the electron emitters 108 and storage medium 110 can be moved relative to each other in the X and Y directions noted in FIG. 2. To provide this relative movement, data storage device 100 can include a micromover 112 that scans the storage medium 110 with respect to the electron emitters 108. As indicated in FIGS. 1 and 3, the micromover 112 can include a rotor 114 connected to the storage medium 110, a stator 116 that faces the rotor 114, and one or more springs 118 that are positioned to the sides of the storage medium. As is known in the art, displacement of the rotor 114, and thereby the storage medium 110, can be effected by the application of appropriate voltage potentials to electrodes 117 (see FIG. 3) of the stator 116 so as to create a field that displaces the rotor 114 in a desired manner.

When the micromover 112 is displaced in this manner, the micromover scans the storage medium 110 to different locations within the X-Y plane such that each emitter 108 is positioned above a particular storage area. A preferred micromover 112 has sufficient range and resolution to position the storage areas 110 under the electron emitters 108 with high accuracy. By way of example, the micromover 112 can be fabricated through semiconductor micro-fabrication processes. Although relative movement between the electron emitters 108 and the storage medium 110 has been described as being accomplished through displacement of the storage medium, it will be understood that such relative movement can alternatively be obtained by displacing the electron emitters or by displacing both the electron emitters and the storage medium. Moreover, although a particular micromover 112 is shown and described herein, it will be appreciated by persons having ordinary skill in the art that alternative moving means could be employed to obtain such relative movement.

Alignment of an emitted beam and storage area can be further facilitated with deflectors (not shown). By way of example, the electron beams can be rastered over the surface of the storage medium 110 by either electrostatically or electromagnetically deflecting them, as through use of electrostatic and/or electromagnetic deflectors positioned adjacent the emitters 108. Many different approaches to deflect electron beams can be found in literature on scanning electron microscopy (SEM).

The electron emitters 108 are responsible for reading and writing information on the storage areas of the storage medium 110 with the electron beams they produce. Therefore, the electron emitters 108 preferably produce electron beams that are narrow enough to achieve the desired bit density for the storage medium 110, and that provide the different power densities needed for reading from and writing to the storage medium 110. A particular exemplar embodiment for the electron emitters 108 is provided in FIG. 7.

As indicated in FIGS. 1 and 2, data storage device 100 can further include one or more supports 120 that keep the storage medium 110 in place within the interior space 104. When provided, the supports 120 typically comprise thin-walled microfabricated beams that flex when the storage medium 110 is displaced in the X and/or Y directions. As is further indicated in FIG. 2, the supports 120 can each be connected to the walls 106 of the casing 102.

Figure 4:
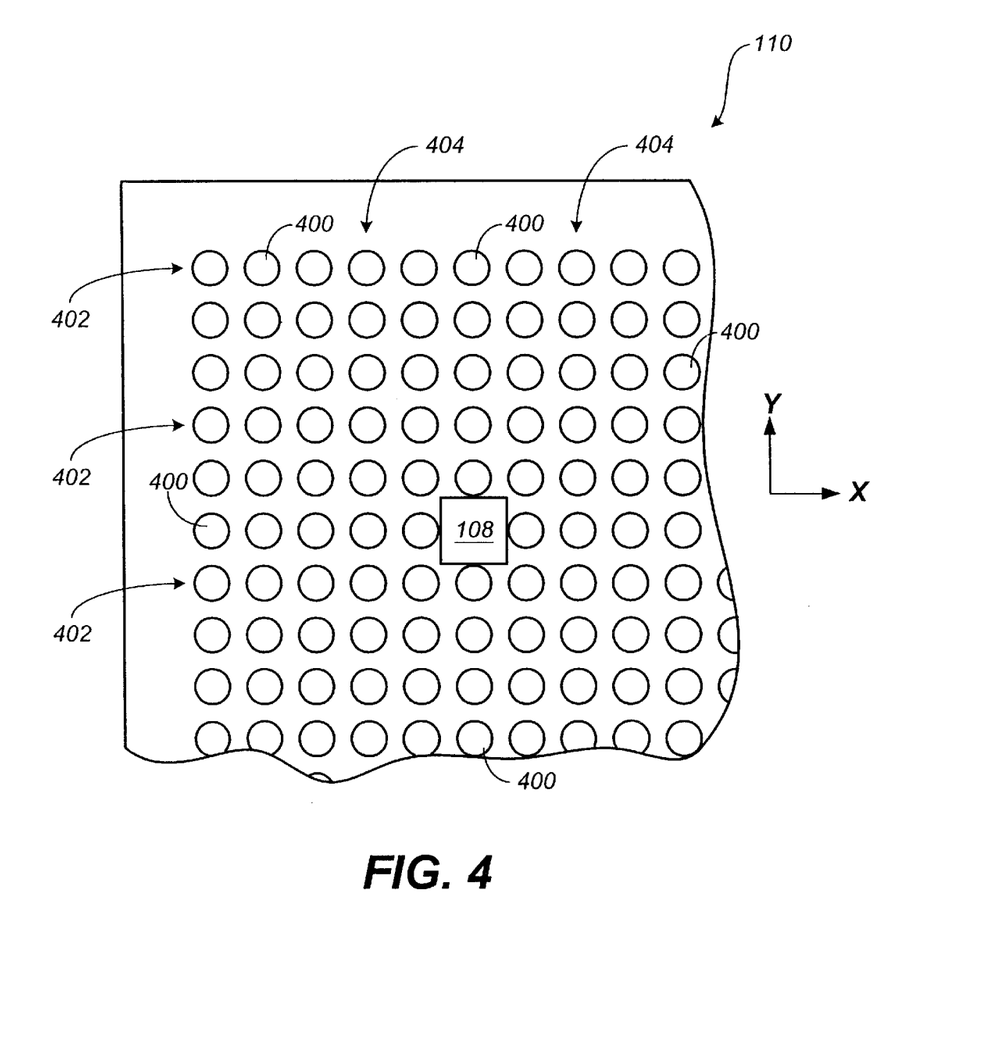
FIG. 4 is a partial plan view of a storage medium of the data storage device shown in FIGS. 1–3.

In a preferred embodiment, the electron emitters 108 are contained within a two-dimensional array comprising a plurality of emitters. By way of example, an array of 100×100 electron emitters 108 can be provided with an emitter pitch of approximately 5 to 100 micrometers in both the X and Y directions. As discussed above, each emitter 108 typically is used to access a plurality of storage areas of the storage medium 110. FIG. 4 provides a schematic representation of this relationship. In particular, the schematic presented in FIG. 4 illustrates a single electron emitter 108 positioned above a plurality of storage areas 400 of the storage medium 110. As indicated in FIG. 4, the storage areas 400, like the electron emitters 108, are contained in a two-dimensional array. In particular, the storage areas 400 are arranged in separate rows 402 and columns 404 on the surface of the storage medium 110. In a preferred embodiment, each electron emitter 108 is only responsible for a predetermined portion of the entire length of rows 402. Accordingly, each electron emitter 108 normally can access a matrix of storage areas 400 of particular rows 402 and columns 404. Preferably, each row 402 that is accessed by a single electron emitter 108 is connected to a single external circuit.

To address a storage area 400, the micromover 112 is activated to displace the storage medium 110 (and/or electron emitters 108) to align the storage area with a particular electron emitter 108. Typically, each electron emitter 108 can access tens of thousands to hundreds of millions of storage areas 400 in this manner. The storage medium 110 can have a periodicity of approximately 1 to 100 nanometers between any two storage areas 400, and the range of the micromover 112 can be approximately 5–100 micrometers. As will be appreciated by persons having ordinary skill in the art, each of the electron emitters 108 can be addressed simultaneously or in a multiplexed manner. It will be appreciated that a parallel electron-emitter accessing scheme can be used to significantly increase the data rate of the storage device 100.

Writing with the data storage device 100 is accomplished by temporarily increasing the power density of an electron beam produced by an electron emitter 108 to modify the surface state of a storage area 400 of the storage medium 110. For instance, the modified state can represent a "1" bit, while the unmodified state can represent a "0" bit. Moreover, the storage areas can be modified to different degrees to represent more than two bits, if desired. In a preferred embodiment, the storage medium 110 is constructed of a material whose structural state can be changed from crystalline to amorphous by electron beams. An exemplar material suitable for the storage medium 110 is germanium telluride (GeTe). Ternary alloys based on GeTe may also be used to realize the storage medium 110. To change from the amorphous to the crystalline state, the beam power density can be increased and then slowly decreased. This increase/decrease heats the amorphous area and then slowly cools it so that the area has time to anneal into its crystalline state. To change from the crystalline to amorphous state, the beam power density is increased to a high level and then rapidly reduced. Although temporary modification of the storage medium 110 is described herein, it will be understood that permanent modification is possible where write-once-read-many (WORM) functionality is desired.

Reading is accomplished by observing the effect of the electron beam on the storage area 400, or the effect of the storage area 400 on the electron beam. During reading, the power density of the electron beam is kept low enough so that no further changes in state of the storage area 400 (i.e., writing) occurs. In a first reading approach, reading is accomplished by collecting the secondary and/or backscattered electrons when an electron beam with a relatively low (i.e., lower than that needed to write) power density is applied to the storage medium 110. In that the amorphous state has a different secondary electron emission coefficient (SEEC) and backscattered electron coefficient (BEC) than the crystalline state, a different number of secondary and backscattered electrons are emitted from a storage area 400 when bombarded with a read electron beam. By measuring the number of secondary and backscattered electrons, the state of the storage area 400 can be determined.

Figure 5:
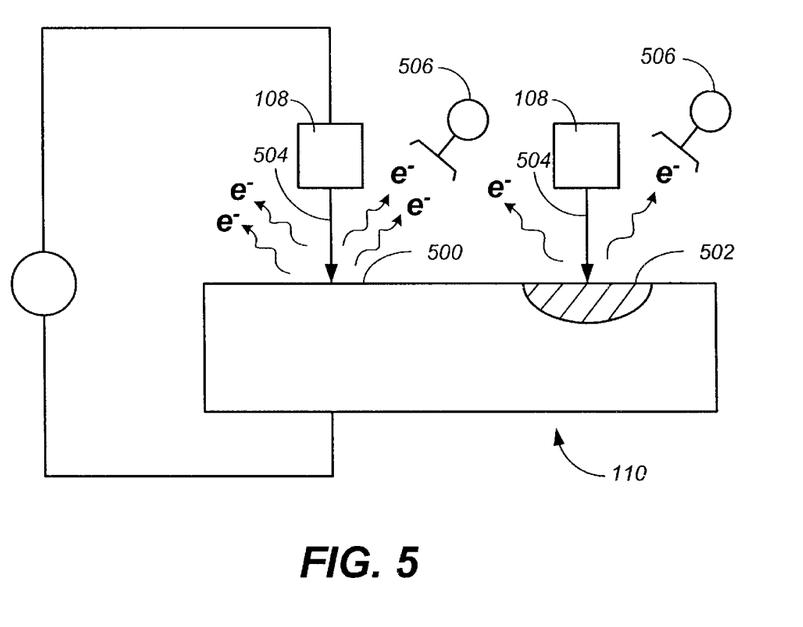
FIG. 5 is a schematic side view of a first example of a reading arrangement for the data storage device of FIGS. 1–4.

FIG. 5 illustrates an exemplar apparatus for reading according to the first reading approach. More particularly, FIG. 5 schematically illustrates electron emitters 108 reading from storage areas 500 and 502 of the storage medium 110. In this figure, the state of storage area 502 has been modified, while the state of storage area 500 has not. When a beam 504 of electrons bombard the storage areas 500, 502 both the secondary electrons and backscattered electrons are collected by electron collectors 506. As will be appreciated by persons having ordinary skill in the art, modified storage area 502 will produce a different number of secondary electrons and backscattered electrons as compared to unmodified storage area 500. The number may be greater or lesser depending upon the type of material and the type of modification made. By monitoring the magnitude of the current collected by the electron collectors 506, the state of and, in turn, the bit(s) stored in the storage areas 500 and 502 can be identified.

Figure 6:
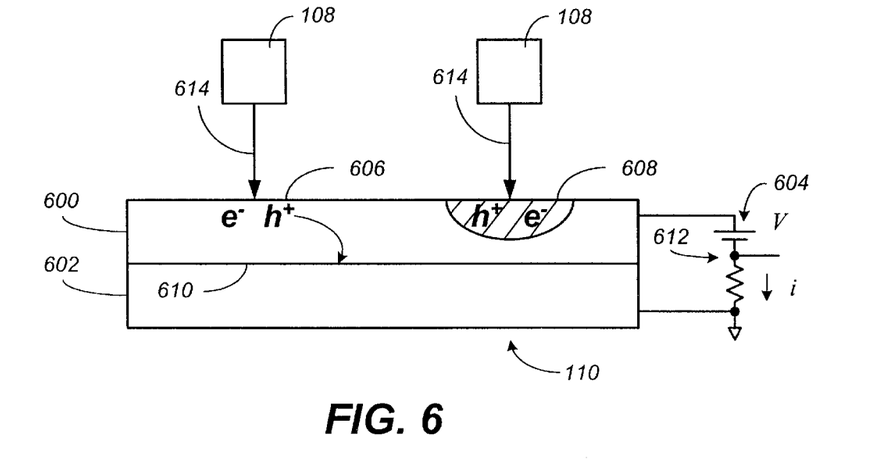
FIG. 6 is a schematic side view of a second example of a reading arrangement for the data storage device of FIGS. 1–4.

In another reading approach, a diode structure is used to determine the state of the storage areas 400. According to this approach, the storage medium 110 is configured as a diode, which can, for example, comprise a p-n junction, a Schottky barrier, or other types of electronic valves. FIG. 6 illustrates an exemplar configuration of such a storage medium 110. It will be understood that alternative diode arrangements (such as those shown in U.S. Pat. No. 5,557, 596) are feasible. As illustrated in FIG. 6, the storage medium 110 is arranged as a diode having two layers 600 and 602. By way of example, one of the layers is a p-type layer and the other is a n-type layer. The storage medium 110 is connected to an external circuit 604 that reverse-biases the storage medium 110. With this arrangement, bits are stored by locally modifying the storage medium 110 in such a way that collection efficiency for minority carriers generated by modified region 608 is different from that of an unmodified region 606. The collection efficiency for minority carriers can be defined as the fraction of minority carriers generated by the incident electrons that are swept across a diode junction 610 of the storage medium 110 when the medium is biased by the external circuit 604 to cause a signal current, i, to flow through the external circuit.

In use, the electron emitters 108 emit narrow beams 614 of electrons onto the surface of the storage medium 110 that excite electron-hole pairs near the surface of the medium. Because the medium 110 is reverse-biased by the external circuit 604, the minority carriers that are generated by the incident electrons are swept toward the diode junction 610. Minority carriers that reach the junction 610 are then swept across the junction. Accordingly, minority carriers that do not recombine with majority carriers before reaching the junction 610 are swept across the junction, causing a current flow in the external circuit 604.

As described above, writing is accomplished by increasing the power density of electron beams to locally alter the physical properties of the storage medium 110. Where the storage medium 110 is configured as shown in FIG. 6, this alteration affects the number of minority carriers swept across the junction 610 when the same area is radiated with a lower power density (i.e., a "read") electron beam. For example, the recombination rate in a written (i.e., modified) area 608 could be increased relative to an unwritten (i.e., unmodified) area 606 so that the minority carriers generated in the written area 608 have an increased probability of recombining with minority carriers before they have a chance to reach and cross the junction 610. Hence, a smaller current flows in the external circuit 604 when the read electron beam is incident upon a written area 608 than when it is incident upon an unwritten area 606. Conversely, it is also possible to start with a diode stricture having a high recombination rate and to write bits by locally reducing the recombination rate. The magnitude of the current resulting from the minority carriers depends upon the state of a particular storage area 606, 608. The resulting current, i, in the external circuit 604 generates an output signal at node 612 indicative of the stored bit(s).

Figure 7:
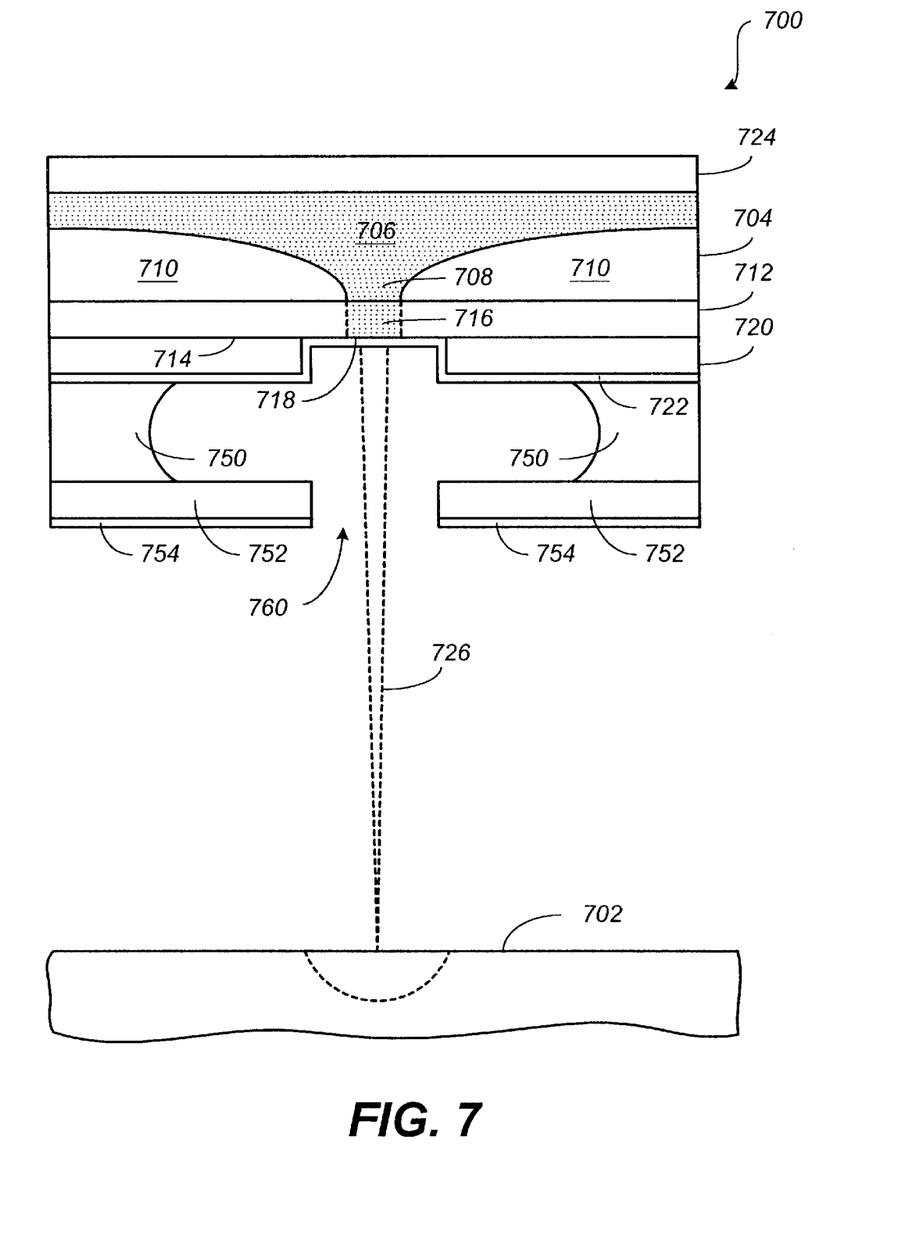
FIG. 7 is a side view of an exemplar flat electron emitter suitable for use with the data storage device of FIGS. 1–4.

As identified above, various hurdles exist to the use of Spindt (i.e., tip) electron emitters. Accordingly, alternative emitter configurations are contemplated. Generally speaking, these alternative electron emitters comprise ballistic or quasi-ballistic electron emitters. For example, co-pending U.S. patent application, titled "Data Storage Device," Ser. No. 09/836,124, filed on Apr. 16, 2001, publication number 02-0150021, published on Oct. 17, 2002, commonly owned by the assignee of the present application, the contents of which is incorporated herein in its entirety, discloses various flat surface electron emitters. More particularly, the electron emitters are configured as flat emitters. FIG. 7 illustrates an exemplar flat electron emitter 700 that can be used in the data storage device 100 to bombard a target 702 (e.g., storage medium 110). As indicated in FIG. 7, the emitter 700 includes a $n^{++}$ semiconductor substrate 704 that, for example, can be made of silicon. Typically, the thickness of the substrate depends upon the size of the wafer used to form the substrate. By way of example, the substrate 704 can be approximately 400 to 1000 micrometers thick. The substrate 704 is fabricated such that it includes a volcano-like, finnel-like, or nozzle-like active region 706. Stated in another way, the active region 706 generally has a wide base that narrows into a neck 708.

The active region 706 is surrounded by an isolation region 710 that limits the geometry of the active region 706 to limit the area from which the active region can emit electrons. By way of example, the isolation region 710 comprises silicon dioxide that is formed through an oxidation process (e.g., wet or dry oxidation). In addition to limiting the geometry of the active region 706, the isolation region 710 may isolate the active region 706 from neighboring active regions (not shown). However, it should be understood that bases of the active regions 706 of contiguous electron emitters 700 can be connected together.

Formed on the substrate 704 is a semiconductor layer 712. By way of example, the semiconductor layer 712 is made of polysilicon or silicon carbide (SiC) and may have a thickness of approximately 0.01 to 2 micrometers. In a preferred arrangement, the semiconductor layer 712 includes a planar outer surface 714 and a porous region 716. As indicated in FIG. 7, the porous region 716 is limited in extent such that it is aligned with the neck 708 of the active region 706. Limiting the porous region in this manner allows for higher current densities due to increased thermal energy dissipation. The porous region 716 terminates at the planar outer surface 714 to define an emission surface 718. In that surface 714 preferably is planar, the emission surface 718 likewise is planar. This configuration permits better focusing of electron beams emitted from the emitter 700. By way of example, the area of the emission surface 718 can be limited to less than approximately 10% of the total area of the outer surface 714 of the semiconductor layer 712. Most preferably, the area of the emission surface 718 is limited to less than approximately 1% of the total area of the surface 714.

The electron emitter 700 further includes an emission electrode 720 formed on the semiconductor layer 712 that is used to supply voltage to the semiconductor layer 712. The emission electrode 720 typically is composed of a highly electrically conductive material such as chromium and can have a thickness of approximately 0.1 to 1 micrometer. In addition to the emission electrode 720, the emitter 700 includes a conductive layer 722 that covers the emission electrode 720 and a portion of the outer surface 714 of the semiconductor layer 712, including the emission surface 718. This layer 722 preferably has a thickness of approximately 10 nanometers or less. The conductive layer 722 provides an electrical contact over the emission surface 718 and allows an electric field to be applied over the emission surface 718. Preferably, the conductive layer 722 comprises an alloy that does not form an insulating oxide or nitride on its surface to avoid the creation of tunnel barriers that would negatively affect the efficiency of the electron emitter 700.

By way of example, the conductive layer 722 can be made of a thin metal or conductive material such as gold, carbon (e.g., graphite, electrically conductive diamond, or combinations thereof), platinum, iridium, rhodium, conductive boron nitride, or other conductors or semiconductors. Generally speaking, materials having atomic numbers substantially below that of gold may also be used for the conductive layer 722 in that such materials do not scatter electrons (which lowers emission efficiency) to the extent that materials having higher atomic numbers do. An element such as carbon, which has a low atomic number, exhibits a very low electron scattering probability. The conductive layer 722 can be porous or semi-dense such that all conductive areas are electrically connected. For example, the conductive layer 722 can include electrically interconnected conductive islands, a mesh of interconnected filaments, or combinations thereof. In an alternative embodiment, the conductive layer 722 can comprise multiple thin layers of metal.

The electron emitter 700 can further include a back contact 724 that is formed on the substrate 704 on a side opposite that on which the semiconductor layer 712 is formed. When provided, the back contact 724 establishes an equipotential surface for internal fields in the semiconductor substrate 704 and the porous region 716. It is to be understood that the back contact 724 can be eliminated if the substrate 704 is highly doped, in which case, a contact can be made to the substrate via a front contact through various known means.

During operation, different potentials are applied (e.g., with on or off-chip drivers) to the substrate 704, the emission electrode 712, and the back contact 724. The resulting emission electrode voltage causes electrons to be injected from the active region 706 of the substrate 704 into the porous region 716 of the semiconductor layer 712 and be emitted from the emission surface 718 and through the conductive layer 722. This emission results in an electron beam 726 that impinges the target 702.

As will be appreciated by persons having ordinary skill in the art, a focusing mechanism may be added to focus the beam 726 on the target 702. One example of such a focusing mechanism can be realized using an insulating layer 750, a lens electrode 752, and a second conductive layer 754. The insulating layer 750 isolates the emission electrode 720 from the lens electrode 752. Like the conductive layer 722, the conductive layer 754 provides a contact over the lens electrode 752 such that an electric field can be applied thereto. As illustrated in FIG. 7, the lens electrode 752 and the conductive layer 754 are formed to define an aperture 760 through which electron beams can pass. In use, a potential is applied to the lens electrode 752. The electric field resulting from the lens electrode voltage at the aperture 760 causes the emitted electrons to be focused. Typically, this focus can be adjusted by varying the potential applied to the lens electrode 752. The electron beam can be focused to a very small spot size, e.g., less than 1 nanometer in diameter, on the target 702. Although a particular focusing arrangement has been shown and described, it will be appreciated by persons having ordinary skill in the art that many different focusing arrangements are possible.

Electron emission can be achieved with emitter structures distinct from those described above. For example, the electron source may be adapted to emit electrons from the surfaces of metal-insulator-metal (MIM) and metal-insulator-oxide (MIS) structures at or below room temperature. This type of electron emission is described in Wade & J Briggs, "Low noise Beams from Tunnel Cathodes," *Journal of Applied Physics* 33, No. 3, pp. 836–840, 1962; Julius Cohen, "Tunnel Emission into Vacuum," *Applied Physics Letters* 1, No3, pp. 61–62, 1962; and Yokoo, et al., "Emission characteristics of metal-oxide-semiconductor electron tunneling cathode," *Journal of Vacuum Science and Technology*, pp. 429–432, 1993. Electrons from MIM and MIS structures are emitted into the vacuum with small divergence angles as described in R. Hrach, *Thin Solid Films* 15, p. 15, 1973. Small divergence angles allow the emitted electrons to be focused into small diameter electron beams.

Electron-Beam Controller (EBC) Architecture and Operation

Figure 8:
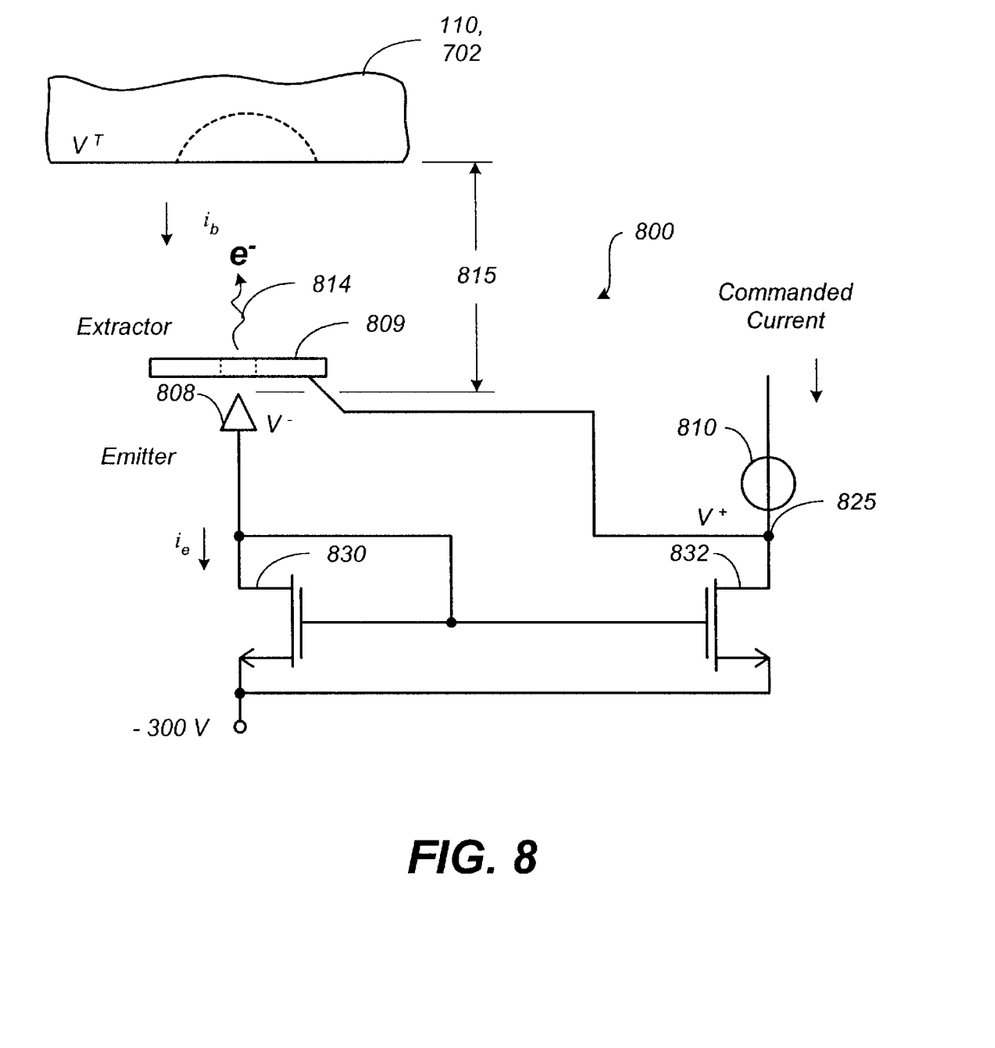
FIG. 8 is a circuit diagram of an embodiment of an electron-beam power controller consistent with the teachings of the present invention that may be applied in the data storage device of FIGS. 1–4.

Reference is now directed to FIG. 8, which presents an embodiment of an electron-beam controller .(EBC) consistent with the teachings of the present invention that may be applied in the data storage device of FIGS. 1–4. It should be appreciated that the data storage device 100 described above requires a relatively accurate and stable control over the emitter current in order to realize repeatable data write and data read operations. Conventional methodologies would control the emitter current by varying the emitter voltage. For example, such a control methodology might apply a control signal at node 825. Importantly, such a control methodology would modify the emitter voltage with respect to the surface of the storage medium 110 to control the beam current. This would cause an undesirable fluctuation in the total beam power delivered to the storage medium 110. As shown in FIG. 8, an electron-beam source having an emitter 808 and an extractor 809 may be used to generate an electron beam 814 that may be further focused to a small spot on the storage medium 110. The total power delivered to the surface of the storage medium 110 is proportional to the electron beam current (flowing in the opposite direction of the electron beam 814) and proportional to the voltage of the emitter relative to the voltage at the surface of the storage medium 110. The power within the electron beam may be determined from the following relationship:

$$\text{Power}_{beam} = i_{beam}(V_{material} - V_{emitter}). \qquad \text{Eq. 1}$$

The total power delivered to the surface of the storage medium 110 is controlled by keeping the emitter (i.e., $V_{emitter}$) to media voltage (i.e., $V_{material}$) constant, while controlling the electron beam current, $i_{beam}$, hereinafter, $i_b$. The circuit illustrated in FIG. 8 accomplishes electron beam control by measuring the emitter current, $i_e$, and varying the extractor voltage in a feedback control loop to set the emitter current to a desired level. By keeping the emitter voltage constant and controlling the magnitude of the electron beam current, $i_b$, with the extractor voltage, the resulting electron beam incident at the surface of the storage medium 110 is of consistent and controllable power.

The EBC 800 of FIG. 8 presents an embodiment of this alternative control mechanism. As illustrated in the circuit diagram of FIG. 8, an extractor 809 introduced near the emitter 808 may be used to indirectly control the emitter current, $i_e$, and consequently, the electron-beam energy incident at the surface of the storage medium 110. The voltage between the extractor, $V^+$, and the emitter, $V^-$, effects the number of electrons emitted from the tip of the emitter 808. The additional voltage difference (not shown) between the extractor and the surface of the storage medium 110 accelerates each of the emitted electrons in the electron beam 814 and ensures that the electrons traverse the gap 815 between the emitter 808 and the storage medium 110.

Since a read operation is operable through a measure of the total energy present in the electron beam 814, rather than the beam current, $i_b$, it is desirable to hold the emitter voltage and the voltage at the surface (i.e., a target surface for the electron beam) of the storage medium 110 constant, while controlling the voltage on the extractor, V⁺. The current mirror formed by field-effect transistors (e.g., metal-oxide semiconductor field-effect transistor or MOSFETs) 830, 832 provides an indirect measure of the beam current, $i_b$. Importantly, the drain and the gate of MOSFET 830 are connected to form the current mirror. Current source 810, provides a commanded current or the current desired in the electron beam 814 (i.e., $i_b$). As a result of the configuration presented in FIG. 8, when $i_b$ is smaller than desired, the voltage on the extractor will increase, which will cause an increase in $i_b$. Conversely, when $i_b$ is larger than desired, the voltage on the extractor will decrease, which will cause a decrease in $i_b$. Importantly, the resulting fluctuations over time in $i_b$ will not adversely affect the potential difference between the storage medium 110 (i.e., the voltage component of the power in the electronic beam $V_{material} - V_{emitter}$ can remain constant) and the emitter 808.

Figure 9:
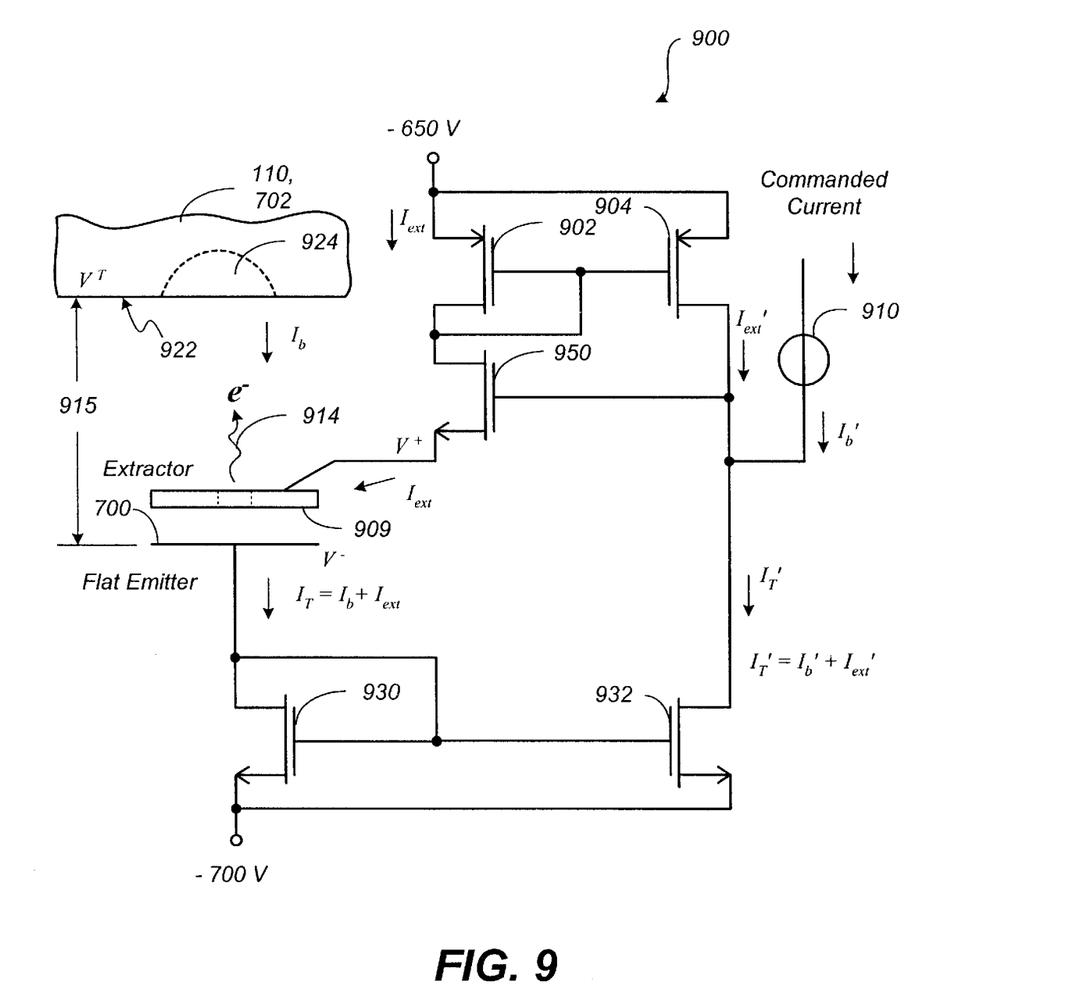
FIG. 9 is a circuit diagram of a second embodiment of an electron-beam power controller consistent with the teachings of the present invention that may be applied in the data storage device of FIGS. 1–4.

Reference is now directed to FIG. 9, which illustrates a second embodiment of an EBC consistent with the teachings of the present invention that may be applied in the data storage device of FIGS. 1–4. EBC 900 illustrates a similar control mechanism as that applied to the "Spindt" or "tip" emitters in the EBC 800 revealed in FIG. 8. However, EBC 900 supports the use of a flat emitter 700, such as the flat emitter previously illustrated and described in association with FIG. 7. As illustrated in FIG. 9, the electron beam 914 traverses the gap 915 between the flat emitter 700 and the lower surface 922 of the storage medium 110 in order to sense the state of a portion of the storage medium 924 and/or to change the state of the portion of the storage medium 924 as may be desired.

A difference that leads to the solution illustrated in FIG. 9 is that the extractor current component, $i_e$, far exceeds the beam current component, $i_b$, of the total emitter current, $I_T$. Consequently, it becomes more difficult to accurately control the beam current, $i_b$. Stated another way, if you measure and control the total emitter current, $I_T$, in the hopes of controlling the beam current, $i_b$, even relatively accurate control of $I_T$, does not guarantee or result in accurate control of $i_b$. This circuit would also be useful for any type of emitter where the extractor current is a significant portion of the total emitter current.

The dual current mirror configuration illustrated in FIG. 9 permits accurate control of the beam current, $i_b$, for low-efficiency flat emitters 700. As illustrated in FIG. 9, an extractor 909 (e.g., the conductive layer 722 of the low-efficiency flat emitter of FIG. 7) disposed near the flat emitter 700 may be used to indirectly control the beam current, $i_b$, and consequently, the electron-beam energy incident at the surface of the storage medium 110. As in the circuit of FIG. 8, the voltage between the extractor, V⁺, and the emitter, V⁻, effects the number of electrons emitted from the flat emitter 700.

As further illustrated in the circuit of FIG. 9, a second current mirror formed by MOSFETs 902 and 904 provides a sample, $I_{ext}'$, of the extractor current, $I_{ext}$. Current source 910, provides a commanded current, $I_b'$, or the equivalent current desired in the electron beam 914 (i.e., $i_b$). The current mirror formed by MOSFETs 930 and 932 provides an indirect measure of the beam current, $I_b$, by measuring the total current in the flat emitter 700 (i.e., $I_T = I_b + I_{ext}$). The circuit illustrated in FIG. 9 adjusts $I_b$ over time such that $I_b$ is in equilibrium with the injected or commanded current, $I_b'$. The circuit accomplishes this result as follows. Under conditions when $I_b$ is smaller than desired, the voltage on the extractor will increase, which will cause an increase in $I_b$. Conversely, when $I_b$ is larger than desired, then $I_T$ is too high, or $I_T'$ is larger than the sum of $I_b'$ and $I_{ext}'$. Consequently, the voltage on the extractor will decrease, which will cause a decrease in $I_b$. Note that in the present embodiment, the EBC 900 includes a voltage buffer 950 (e.g., a transistor) that prevents current from traversing from the right-hand side of the current mirror to the left-hand side of the current mirror. In this way, voltage buffer 950 assists in maintaining the current mirror equilibrium between the right and left sides of EBC 900. Stated another way, the current mirror formed by MOSFETs 930 and 932 and the second current mirror formed by MOSFETs 902 and 904 coupled with the voltage buffer 950 serves to isolate the extractor current, $I_{ext}$, from the commanded or input current 910. As in the EBC embodiment 800 presented in FIG. 8, fluctuations in $I_b$ will not affect the potential difference between the storage medium 110 and the emitter 700.

In preferred embodiments, voltage buffer 950 is realized with a MOSFET. It will be appreciated that the high-impedance between the gate and the emitter of a MOSFET, permits the MOSFET to sufficiently buffer or isolate each of the transistor pairs within the plurality of current mirrors (i.e., the current mirror formed by MOSFETs 930 and 932 and the second current mirror formed by MOSFETs 902 and 904).

Figure 10:
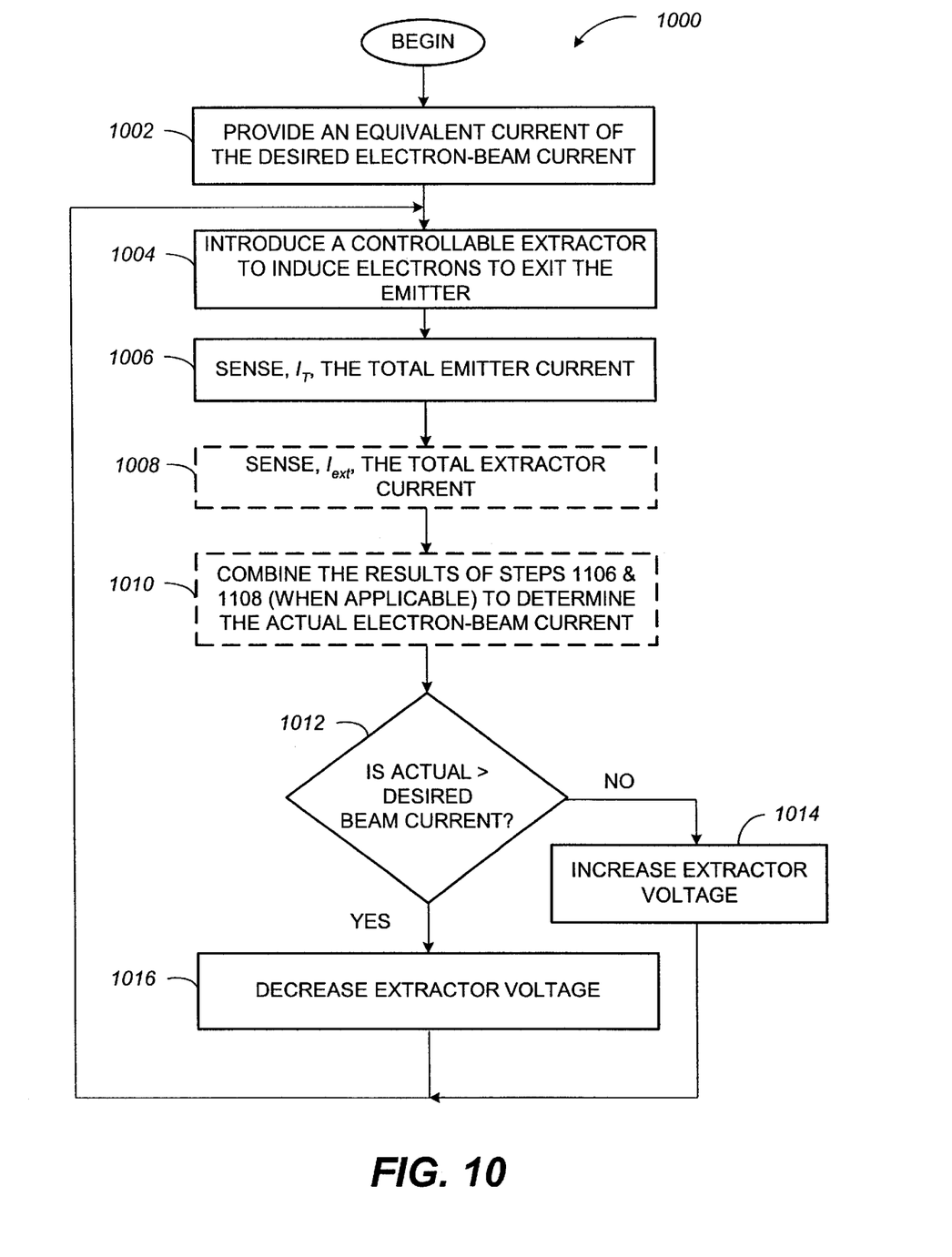
FIG. 10 is a flow chart illustrating a method for controlling the intensity of an electron-beam that may be realized by the circuits of FIGS. 8–9.

Reference is now directed to FIG. 10, which is a flow chart illustrating a method for controlling the energy within an electron-beam that may be realized by the circuits of FIGS. 8–9. As illustrated in FIG. 10, the method for controlling the energy within an electron-beam 1000 begins by providing a current having an equivalent magnitude to the desired electron-beam current as indicated in step 1002. It should be appreciated that the desired electron-beam current may vary in accordance with the material selected for the storage medium, whether it is desired to sense the condition of the material (i.e., a read operation), or whether it is desired to modify the material (i.e., a write operation). It should be further appreciated that the desired electron-beam current may vary within a range of various values selected for the ability to store information that may represent multiple bits.

Next, in step 1004, and as illustrated in each of the various circuits illustrated in FIGS. 8–9, an extractor is introduced in order to induce electrons to exit the various emitters 700, 808. Once the electron beam has been established via the following preliminary steps, the circuits of FIGS. 8–9 may then sense the total emitter current as indicated in step 1006. As further indicated by the dashed lines surrounding the descriptions for steps 1008 and 1010, the various circuits presented in FIGS. 8–9 use distinct electron beam control mechanisms. As previously explained with regard to the EBC 800 illustrated in FIG. 8, the emitter current in these circuit configurations can be used to estimate the electron-beam current incident at the surface of the storage medium 110. EBC 900 illustrated in FIG. 9 differs from the EBC 800 in that the extractor 909 supplies a significant portion of the total emitter current. As a result, the low-efficiency flat emitter configuration illustrated in FIG. 9 senses the total extractor current as indicated in step 1008. After having sensed both the extractor current and the total emitter current in steps 1006 and 1008, the circuit of FIG. 9 combines the currents as indicated in step 1010 in such a way that the actual beam current tracks the current provided in step 1002.

The control methodology described above is further illustrated in steps 1012–1016. More specifically, if the actual beam current (i.e., $I_b$ in the circuit of FIG. 9) is less than the desired beam current (i.e., $I_b'$ or the negative branch from the query of step 1012), then the dual current mirror circuit configuration illustrated in FIG. 9 increases the extractor voltage as indicated in step 1014, which in turn will increase the actual beam current. Conversely, if the actual beam current (i.e., $I_b$ in the circuit of FIG. 9) is greater than the desired beam current (i.e., $I_b'$ or the affirmative branch from the query of step 1012), then the dual current mirror circuit configuration illustrated in FIG. 9 decreases the extractor voltage as indicated in step 1016, which in turn will decrease the actual beam current. As further illustrated in the flow chart of FIG. 10, steps 1002 through 1016 may be repeated as desired to control the electron beam power over time.

It should be appreciated that steps 1006 and 1008 may be performed substantially simultaneously or in reverse order from the order presented. After having sensed the emitter current and the extractor current in steps 1006 and 1008, the circuit of FIG. 9 may combine the results to determine the actual electron-beam current as indicated in step 1008. It should be appreciated that subtracting the extractor current from the total emitter current flowing in the circuit of FIG. 9 will result in an indirect measure of the actual electron-beam current flowing into the emitter 700 (FIG. 9) from the storage medium 110 (not shown).

It should be emphasized that the above embodiments of the EBC of the present invention, particularly any preferred embodiments, are merely possible examples of implementations and are set forth for a clear understanding of the principles involved for controlling the power in an electron-beam. Variations and modifications may be made to the above embodiments of the EBC and the various methods without departing substantially from the scope and principles thereof. For example, buffer semiconductors may be added to limit the number of semiconductor devices that may be inserted between relatively high voltage potentials. By way of further example, actual implementations may include on-off control, more advanced current mirrors, and/or performance enhancing circuitry. All such modifications and variations are intended to be included within the scope of this disclosure and protected by the following claims.

What is claimed is:

1. A method for controlling the energy in an electron beam, comprising:

providing an emitter at a predetermined first voltage, a surface of the emitter defining a first boundary of a gap;

arranging a target surface disposed from the emitter, the target surface having a predetermined second voltage, the target surface defining a second boundary of the gap, wherein the gap is designated for traversal by the electronic beam;

introducing an extractor at a controllable third voltage, the extractor at least partially disposed within the gap, wherein the controllable third voltage falls between the first and second voltages and wherein the controllable third voltage induces electrons to exit the emitter by driving an input current having a magnitude equivalent to the current magnitude desired in the electron beam;

estimating the actual electron beam energy by sensing the emitter current; and adjusting the third voltage in response to the sensed emitter current.

2. The method of claim 1, wherein providing and arranging further comprise holding the difference of the predetermined first and second voltages to a constant.

3. The method of claim 1, wherein estimating comprises applying the emitter current to a current mirror.

4. The method of claim 1, wherein adjusting comprises applying the input current to a current mirror.

5. A method for controlling energy in an electron beam, comprising:

providing an emitter at a predetermined first voltage, a surface of the emitter defining a first boundary of a gap;

arranging a target surface disposed from the emitter, the target surface having a predetermined second voltage, the target surface defining an opposing boundary of the gap, wherein the gap is designated for traversal by the electronic beam;

introducing an extractor at a controllable third voltage, the extractor at least partially disposed within the gap, wherein the controllable third voltage is driven by an input current having a magnitude equivalent to the current magnitude desired in the electron beam and falls between the first and second voltages thereby inducing electrons to exit the emitter;

estimating the actual electron beam energy by sensing both the emitter current and the extractor current; and adjusting the third voltage in response to the sensed emitter and extractor currents.

6. The method of claim 5, wherein providing and arranging further comprise holding the predetermined first and second voltages to a predetermined range.

7. The method of claim 5, wherein estimating comprises applying the emitter current to a current mirror.

8. The method of claim 5, wherein the extractor current is supplied with a first current mirror and the emitter current is sensed with a second current mirror.

9. The method of claim 5, wherein the input current is inserted at a node disposed between a first current mirror and a second current mirror.

10. The method of claim 9, further comprising:

isolating the extractor current from the input current.

11. The method of claim 10, wherein isolating comprises inserting a voltage buffer between the first current mirror and the extractor.

12. The method of claim 11, wherein the voltage buffer comprises a metal-oxide semi-conductor field-effect transistor (MOSFET).

13. The method of claim 12, wherein the gate of the MOSFET is coupled to the input current.

14. An integrated circuit electron-beam controller, comprising:

means for setting the voltage at an emitter in response to a predetermined voltage at a target such that a potential difference exists between the emitter and the target;

means for extracting electrons from the emitter to induce an electron beam to traverse a gap disposed between the emitter and the target;

means for determining a desired electron beam current magnitude;

means for indirectly sensing the actual electron beam current;

means for comparing the indirectly sensed actual electron beam current with the desired electron beam current; and means for adjusting the extracting means responsive to the comparing means.

15. The controller of claim 14, wherein the means for determining is responsive to at least one control algorithm, the at least one control algorithm configured to modify the state of a target material at a designated location in response to a data write request.

16. The controller of claim 14, wherein the means for determining is responsive to at least one control algorithm, the at least one control algorithm configured to sense a condition of a target material at a designated location in response to a data read request.

17. The controller of claim 14, wherein the means for indirectly sensing comprises a current mirror coupled to the emitter.

18. The controller of claim 14, wherein the means for comparing receives an input current equivalent in magnitude with the desired electron beam current.

19. The controller of claim 14, wherein the means for adjusting comprises a current mirror coupled to an input current equivalent in magnitude with the desired electron beam current.

20. An integrated circuit electron-beam energy controller, comprising:

a target having a predetermined voltage;

an emitter disposed away from the target, the emitter having a second voltage different from the predetermined voltage at the target such that a voltage difference exists between the emitter and the target;

an extractor at least partially disposed in a gap bounded by respective surfaces of the target and the emitter, the extractor having a third voltage such that a voltage difference exists between the emitter and the extractor; and a current mirror electrically coupled to the emitter and the extractor.

21. The controller of claim 20, wherein the current mirror provides an indirect measure of the current within the electron beam.

22. The controller of claim 20, wherein the current mirror comprises a pair of field effect transistors.

23. The controller of claim 22, wherein the emitter is electrically coupled to the gates of the field effect transistors.

24. The controller of claim 22, further comprising a controllable current source electrically coupled to the extractor.

25. The controller of claim 22, further comprising a controllable current source electrically coupled to the current mirror.

* * * * *